(12) United States Patent
Kaltenbach et al.

(10) Patent No.: US 8,388,492 B2
(45) Date of Patent: Mar. 5, 2013

(54) METHOD FOR DETERMINING STATES OF HYBRID DRIVE TRAIN OF A VEHICLE

(75) Inventors: Johannes Kaltenbach, Friedrichshafen (DE); Stefan Wallner, Friedrichshafen (DE); Ralf Dreibholz, Meckenbeuren (DE); Friedrich Tenbrock, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 440 days.

(21) Appl. No.: 12/739,244

(22) PCT Filed: Oct. 16, 2008

(86) PCT No.: PCT/EP2008/063940
§ 371 (c)(1),
(2), (4) Date: Apr. 22, 2010

(87) PCT Pub. No.: WO2009/053298
PCT Pub. Date: Apr. 30, 2009

(65) Prior Publication Data
US 2010/0304921 A1 Dec. 2, 2010

(30) Foreign Application Priority Data
Oct. 24, 2007 (DE) .......................... 10 2007 050 652

(51) Int. Cl.
*B60W 10/02* (2006.01)
*B60W 10/06* (2006.01)

(52) U.S. Cl. ........................................... 477/3; 903/930

(58) Field of Classification Search .................. 477/3, 5; 903/930
See application file for complete search history.

(56) References Cited

U.S. PATENT DOCUMENTS

| 5,558,173 | A | 9/1996 | Sherman |
| 5,856,709 | A | 1/1999 | Ibaraki et al. |
| 5,873,426 | A | 2/1999 | Tabata et al. |
| 6,333,612 | B1 | 12/2001 | Suzuki et al. |
| 6,443,126 | B1 | 9/2002 | Morimoto et al. |
| 2002/0042323 | A1* | 4/2002 | Bitzer et al. ..................... 477/3 |
| 2003/0098187 | A1 | 5/2003 | Phillips et al. |
| 2004/0035618 | A1 | 2/2004 | Grassl et al. |
| 2005/0255963 | A1* | 11/2005 | Hsieh et al. ..................... 477/3 |
| 2006/0042587 | A1* | 3/2006 | Ellinger et al. ............... 123/305 |

FOREIGN PATENT DOCUMENTS

| DE | 100 47 969 A1 | 5/2001 |
| DE | 100 49 015 B4 | 6/2001 |
| DE | 102 46 146 A1 | 7/2003 |
| EP | 0 645 271 A2 | 3/1995 |
| EP | 0 773 127 A2 | 5/1997 |
| WO | 02/026 520 A1 | 4/2002 |

* cited by examiner

Primary Examiner — Edwin A Young
(74) Attorney, Agent, or Firm — Davis & Bujold, PLLC

(57) ABSTRACT

A method for determining conditions of a hybrid drive train of a motor vehicle. The method determines, the actual conditions (1, 2, 3, 4, 5, 6, 7, 8) of the drive train from predetermined condition parameters of the actuating device of the hybrid control. The condition parameters include whether or not a flow of force is present between a combustion engine (VM) and an electrical engine (EM), whether or not the combustion engine (VM) is operating, and whether or not a flow of force to the output is present.

11 Claims, 1 Drawing Sheet

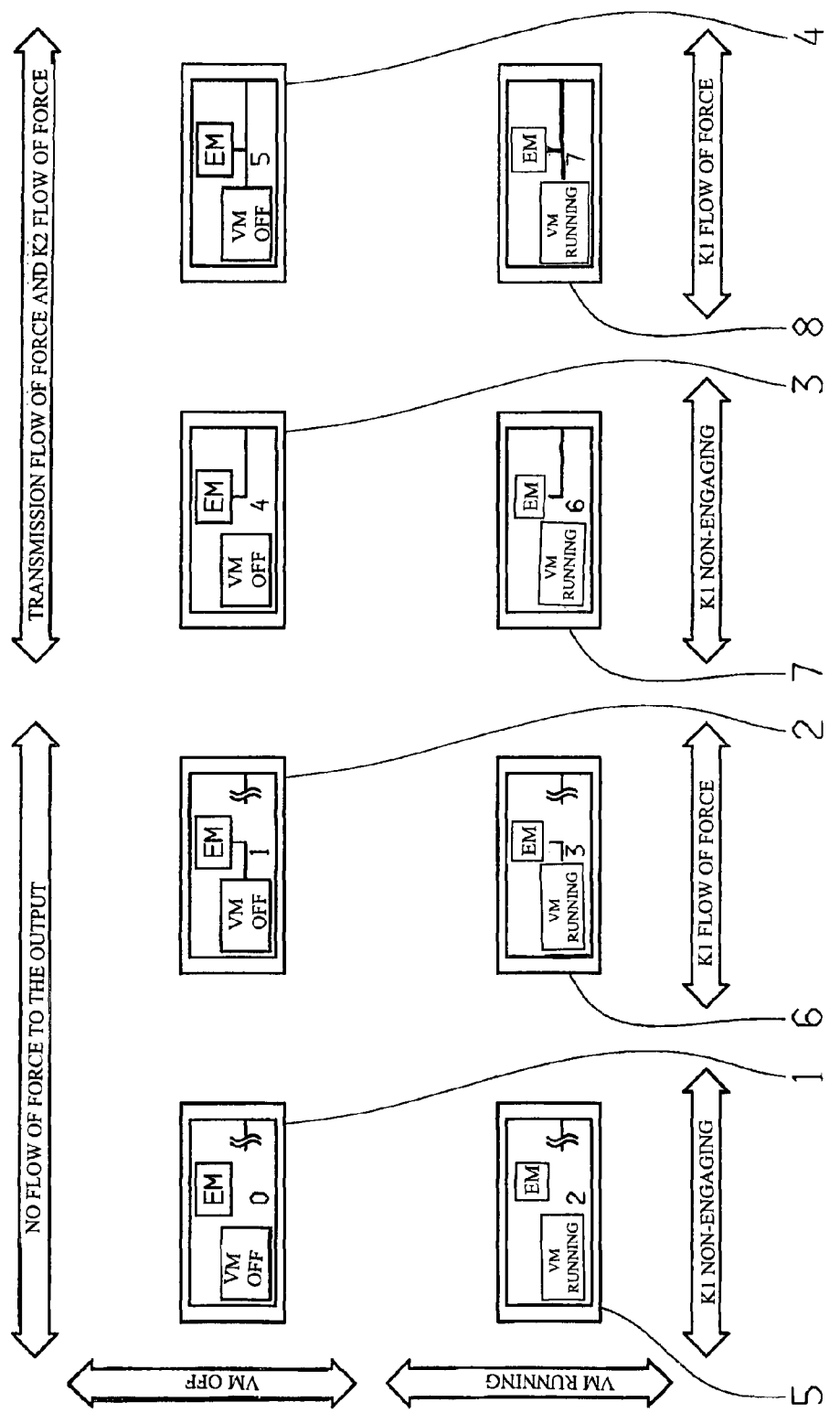

METHOD FOR DETERMINING STATES OF HYBRID DRIVE TRAIN OF A VEHICLE

This application is a National Stage completion of PCT/EP2008/063940 filed Oct. 16, 2008, which claims priority from German patent application serial no. 10 2007 050 652.1 filed Oct. 24, 2007.

FIELD OF THE INVENTION

The present invention concerns a method for determining the condition of a hybrid drive train of a motor vehicle.

BACKGROUND OF THE INVENTION

A method for determining the condition of a hybrid drive train of a motor vehicle is known in the motor vehicle technology. However, in a disadvantageous manner, this method produces twelve different drive train conditions.

SUMMARY OF THE INVENTION

Thus, it is the task of the invention to propose a method, based on the previously described genus, producing less drive train conditions.

Therefore, a method for determining the actual conditions of a hybrid drive train is proposed in which, through predetermined condition parameters of a hybrid control, especially from condition parameters of an actuating device, the actual conditions of a drive train are determined. Hereby, the actual conditions of the hybrid drive train are determined as a condition parameter for the hybrid control. Thus, the amount of actual conditions of the hybrid drive train is reduced. Due to the fact that the respective actual condition of the drive train derives, from the actuating device parameters, a so-called "dead lock" is very unlikely.

Within the scope of a possible embodiment variation in this invention, it can be provided that the condition parameters, for determination of the actual condition of the hybrid drive train, use just three logical parameters. Preferably, it can be verified if the clutch, between the combustion engine and the electrical engine, is engaged for a flow of force or not. It can also be verified whether or not the combustion engine is operating. Finally, it can be verified whether or not a flow of force exists towards the output. This flow of force is a combination of the flow of force in a second clutch, meaning the clutch provided between the electrical engine and the transmission, and of the flow of force to the transmission. Other or additional parameters of the condition can also be used as logical parameters.

Through the combination of the three logical parameters of the condition of the actuating device of the hybrid control, in an advantageous way, just eight actual conditions derive for the hybrid drive train.

An additional advantageous aspect of the invention is the fact that the actual condition, determined in each case based on the condition parameters of the actuating device, is maintained depending on an active operating function. Thus, the actual condition of the drive train, independent of the actual operating function, is maintained or stored longer, respectively. The holding or storing, respectively, of the actual condition of the hybrid drive train can be provided for a predetermined time interval. For instance, a condition can be provided that the first clutch, between the combustion engine and the electrical engine, is not only generating a flow of force but that the clutch is also fully engaged. Other conditions can also be applied.

Through the individual holding of a condition, in dependency of the active operating function, in accordance with the next embodiment, a possibility arises that the predetermined actual condition is apply as a start and as in a marker for an operating processes.

Preferably, the proposed method can be used, for instance, for local city buses, distribution trucks and transport vehicles where, for instance, the design of the hybrid function is accordingly modified in the provided hybrid control device. Other areas of applications are also possible.

BRIEF DESCRIPTION OF THE DRAWINGS

In the following, the present invention is explained based on the drawing. The only drawing of the invention shows an exemplary presentation of the different condition parameters of an actuating device of the hybrid control and the assigned actual conditions 1, 2, 3, 4, 5, 6, 7, 8 of the hybrid drive train.

DETAILED DESCRIPTION OF THE PREFERRED EMBODIMENTS

Below the conditions 1, 2, 3, 4, 5, 6, 7, 8 of the hybrid drive train, the first condition parameter is presented, whereby two double arrows are marked with "K1 non-engaged", which means that the first clutch K1, it is the clutch between the combustion engine VM and the electrical engine EM, is non-engaged, and whereby two double arrows are marked with the "K1 flow of force", which indicates the first clutch K1 performs a flow of force.

The second condition parameter, on the left and next to conditions 1, 2, 3, 4, 5, 6, 7, 8 of the hybrid drive train, is indicated by two double arrows. The first double arrow is marked as "VM running", which means that the combustion engine VM is operating, and the second double arrow is marked as "VM off", which means that the combustion engine VM is shut off.

Finally, the third condition parameter is indicated above the eight conditions 1, 2, 3, 4, 5, 6, 7, 8 of the hybrid drive train by two double arrows. The first double arrow is marked as "no flow of force to the output", which means that the second clutch K2, it is the clutch positioned between the electric engine EM and the transmission, is non-engaged. The second double arrow is marked as "transmission flow of force and K2 flow of force", which means that the second clutch K2 is engaged and, therefore, a flow of force between the combustion engine VM and the electric engine EM, on one hand, and with the transmission, on the other hand, is enabled.

Through the three logical actuator device parameters, eight drive train conditions 1, 2, 3, 4, 5, 6, 7, 8 derive which are presented in the drawing. When the combustion engine VM is shut off, four drive train conditions 1, 2, 3, 4 derive. If there is no flow of force provided to the output, the drive train condition 1 arises with a non-engaged first clutch K1, and the drive train condition 2 arises at a flow of force in the first clutch K1, meaning that the first clutch is disengaged. During a flow of force to the transmission, via the second clutch K2, the drive train condition 3 arises when the first clutch K1 is non-engaged, and the drive train conditions 4 arises with a flow of force through the first clutch K1.

If the combustion engine VM is running, also four additional drive train conditions 5, 6, 7, 8 are established. If there is no flow of force to the output, the drive train condition 5 arises with a non-engaged clutch K1, and the drive train condition 6 arises with a flow of force through the clutch K1. If there is a flow of force to the transmission, the drive train condition 7 arises with a flow of force through the second clutch K2 and a non-engaged clutch K1, and the drive train condition 8 arises with a flow of force through the clutch K1.

It is also possible to accommodate several electrical engines in this method.

REFERENCE CHARACTERS 1 to 8 different actual conditions of the hybrid drive train
VM combustion engine
EM electrical engine
K1 first clutch between the combustion engine and the electrical engine
K2 second clutch between the electrical engine and the transmission

The invention claimed is:

1. A method of determining conditions of a hybrid drive train of a motor vehicle via an actuating device of a hybrid control for the motor vehicle, the method comprising the steps of:
   determining, as a first condition parameter, whether or not a first clutch that is located between a combustion engine and an electrical engine is engaged;
   determining, as a second condition parameter, whether or not the combustion engine is operating;
   determining, as a third condition parameter, whether or not a second clutch that is located between the electrical engine and a transmission is engaged; and
   determining actual conditions (1, 2, 3, 4, 5, 6, 7, 8) of the hybrid drive train from the first, the second and the third condition parameters of the hybrid control.

2. The method according to claim 1, further comprising the step of
   determining, as the first condition parameter, whether or not a flow of force is present between a combustion engine (VM) and an electrical engine (EM),
   determining, as the second condition parameter, whether or not the combustion engine (VM) is operating, and
   determining, as the third condition parameter, whether or not a flow of force to an output is present.

3. The method according to claim 2, further comprising the step of determining eight actual conditions (1, 2, 3, 4, 5, 6, 7, 8) of the drive train from a logical combination of the first, the second and the third condition parameters of the actuating device.

4. The method according to claim 1, further comprising the step of maintaining each actual condition (1, 2, 3, 4, 5, 6, 7, 8) of the drive train, determined by the first, the second and the third condition parameter of the actuating device, in dependency with an active operating function.

5. The method according to claim 4, further comprising the step of storing the actual condition (1, 2, 3, 4, 5, 6, 7, 8) of the drive train for a predetermined time interval.

6. The method according to claim 4, further comprising the step of establishing, for each of the first, the second and the third operating function, predetermined conditions.

7. The method according to claim 4, further comprising the step of using the determined actual condition (1, 2, 3, 4, 5, 6, 7, 8) as one of a start identification and an end identification for an operating process of the active operating function.

8. The method according to claim 1, further comprising the steps determining that the hybrid drive train is in one of four 4-actual conditions when a flow of force is present between the combustion engine (VM) and the electrical engine (EM),
   subsequently determining that the hybrid drive train is in one of two actual conditions when the combustion engine (VM) is operating, and
   then determining the actual condition of the hybrid drive train when a flow of force to an output is present.

9. A method of determining an actual condition of hybrid drive train a motor vehicle, the hybrid drive train including a combustion engine, an electrical motor, a transmission and first and second clutches, the first clutch being located, with respect to a flow of power, between the combustion engine and the electrical motor and the second clutch being located, with respect to the flow of power, between the electrical motor and the transmission, the method comprising the steps of:
   determining, as a first condition parameter, an engagement condition of the first clutch;
   determining, as a second condition parameter, an operating condition of the combustion engine;
   determining, as a third condition parameter, an engagement condition of the second clutch; and
   considering the first, the second and the third condition parameters of the first clutch, the combustion engine and the second clutch, respectively, to determine the actual condition of the hybrid drive train.

10. The method according to claim 9, further comprising the step of determining, as the first condition parameter, if the first clutch is fully engaged.

11. The method according to claim 9, further comprising the steps of
   concluding that the hybrid drive train is in a first actual condition, if the first clutch is disengaged, the combustion engine is off and the second clutch is disengaged;
   concluding that the hybrid drive train is in a second actual condition, if the first clutch is disengaged, the combustion engine is running and the second clutch is disengaged;
   concluding that the hybrid drive train is in a third actual condition, if the first clutch is engaged, the combustion engine is off and the second clutch is disengaged;
   concluding that the hybrid drive train is in a fourth actual condition, if the first clutch is engaged, the combustion engine is running and the second clutch is disengaged;
   concluding that the hybrid drive train is in a fifth actual condition, if the first clutch is disengaged, the combustion engine is off and the second clutch is engaged;
   concluding that the hybrid drive train is in a sixth actual condition, if the first clutch is disengaged, the combustion engine is running and the second clutch is engaged;
   concluding that the hybrid drive train is in a seventh actual condition, if the first clutch is engaged, the combustion engine is off and the second clutch is engaged; and
   concluding that the hybrid drive train is in an eighth actual condition, if the first clutch is engaged, the combustion engine is running and the second clutch is engaged.

* * * * *